United States Patent [19]

Gelin et al.

[11] Patent Number: 4,976,290

[45] Date of Patent: Dec. 11, 1990

[54] TUBULAR MEMBER HAVING A LINER

[75] Inventors: Robert J. Gelin, Newark, Ohio; Richard D. Blackmore, Northbrook, Ill.

[73] Assignee: Ozite Corporation, Libertyville, Ill.

[21] Appl. No.: 364,858

[22] Filed: Jun. 12, 1989

[51] Int. Cl.⁵ ........................ F16L 9/14; F16L 55/18
[52] U.S. Cl. .................................. 138/141; 138/98; 405/150; 428/300
[58] Field of Search .................. 138/97, 98, 125, 126, 138/103, 123, 124, 141, 140, 174, 149; 428/234, 300, 251, 246, 113, 34.1, 34.5, 36.2; 156/287, 293, 71, 94, 148; 264/229, 269, 36; 405/150

[56] References Cited

U.S. PATENT DOCUMENTS

| | | | |
|---|---|---|---|
| 1,722,764 | 7/1927 | Rasch | 428/234 |
| 3,132,062 | 5/1964 | Lang et al. | 156/287 |
| 3,230,129 | 1/1966 | Kelly | 156/287 |
| 3,511,734 | 5/1970 | Darrow | 156/287 |
| 3,996,967 | 12/1976 | Takada | 138/97 |
| 4,009,063 | 2/1977 | Wood | 156/71 |
| 4,064,211 | 12/1977 | Wood | 264/95 |
| 4,283,457 | 8/1981 | Kolsky et al. | 428/300 |
| 4,361,451 | 11/1982 | Renaud | 156/64 |
| 4,390,574 | 6/1983 | Wood | 128/36 |
| 4,401,696 | 8/1983 | Wood | 427/236 |
| 4,434,115 | 2/1984 | Chick | 264/36 |
| 4,581,085 | 4/1986 | Wood | 156/156 |
| 4,622,196 | 11/1986 | Wood | 264/229 |
| 4,770,562 | 9/1988 | Muller et al. | 405/154 |
| 4,851,274 | 7/1989 | D'Elia | 428/113 |

Primary Examiner—James E. Bryant, III
Assistant Examiner—Gary Graham
Attorney, Agent, or Firm—Wood, Phillips, Mason Recktenwald & Vansanten

[57] ABSTRACT

A tubular member having a liner adhesively affixed to an inner surface thereof. The liner comprises a porous material formed from a plurality of needle-punched unwoven fibers so as to have a pair of oppositely facing surfaces. The liner also includes a first mat of finespun woven filaments of glass defining an inner surface thereof and a second mat of finespun woven filaments of glass defining an outer surface thereof. The inner and outer surfaces of the liner, formed by the first and second mats, are generally coextensive with the porous material. The liner also includes the first mat being secured to an inwardly facing surface of the porous material and the second mat being secured to an outwardly facing surface of the porous material. The liner is adhesively impregnated so as to adhesively bond the outer surface of the liner to the inner surface of the tubular member. Further, a method of lining a tubular member by adhesively bonding a liner to the tubular member is disclosed.

6 Claims, 3 Drawing Sheets

TUBULAR MEMBER HAVING A LINER

FIELD OF THE INVENTION

The present invention is directed to liners for tubular members and, more particularly, to a liner adapted to be permanently adhesively affixed to an inner surface of a tubular member.

BACKGROUND OF THE INVENTION

Generally speaking, there are a variety of applications wherein a tubular member is utilized to convey fluids and/or prevent fluid intrusion. Thus, the tubular member might, by way of example, be utilized to maintain one or more fluids externally and/or internally thereof, e.g., in the case of a gas or liquid conveying or storing pipe or tank or in the case of an electrical conduit or the like where ground water intrusion must be prevented. For all such applications, it is usually critical that the integrity of the tubular member be maintained throughout its length.

In many instances, the tubular member is relatively small in diameter making any repairs difficult if not impossible. There are sewer pipes, for instance, that are on the order of approximately ten inches in diameter which means that any cracks, holes or other breaks, ruptures, tears or gaps must usually be repaired by replacing the pipe which is not only time consuming but very expensive as well. Moreover, with pipes of this diameter, it is usually difficult to pinpoint the exact location of leakage to facilitate repair.

Along these same lines is the fact that leakage in older pipes is often an indication of a general problem in the form of deterioration thereof. It would, nonetheless, be desirable to avoid the necessity of replacing the pipe, or awaiting an ever increasing frequency of leaks and repair, provided there was a suitable technique for substantially restoring or improving the structural integrity of the pipe for its intended purposes. However, in order to be feasible, it is essential that such a repair not only substantially extend the life of the pipe but also do so in a cost effective manner.

In the past, there have been a variety of techniques proposed for successfully addressing these problems. For instance, it has been proposed to adhesively impregnate felt material or the like and use an expansible member to press the material into contact with the inner wall thereof until the adhesive cures and bonds the felt to the pipe. Unfortunately, this technique has not been successful since the felt is subject to shrinkage and an annulus may typically form between the felt and the pipe.

As will be appreciated, the shrinkage of the felt as the adhesive cures means that any fluids which reach the annulus as at the juncture of two interconnecting pipes will still leak. It is also the case that the absence of any bonding of the felt liner to the inner wall of the pipe means that there will be no reinforcement or enhancement of the structural integrity of the pipe which may well be in a deteriorating condition particularly for applications involving pipes that are a part of the generally recognized deteriorating infrastructure of cities such as sewer pipes and the like. Moreover, since the felt liner expands to a fixed diameter, it can wrinkle if the inner diameter of the pipe is less than expected or tear if the inner diameter of the pipe is greater than expected.

While such an approach is of interest, it has remained to provide an entirely satisfactory liner adapted to be permanently adhesively affixed to an inner surface of any tubular member.

The present invention is directed to overcoming one or more of the problems and accomplishing one or more of the resulting objectives as aforementioned

SUMMARY OF THE INVENTION

Accordingly, the present invention is directed to a liner adapted to be permanently adhesively affixed to an inner surface of a tubular member. The liner includes a porous material formed from a plurality of needle-punched unwoven fibers so as to have a pair of oppositely facing surfaces. A first mat of finespun woven filaments of glass generally coextensive with the porous material is provided to define an inner surface of the liner. A second mat of finespun woven filaments of glass generally coextensive with the porous material is provided to define an outer surface of the liner. The liner further includes means for securing each of the first and second mats to a different one of the oppositely facing surfaces of the porous material. With this arrangement, the porous material is preferably formed by needle-punching the unwoven fibers into a sheet-like batt.

In another respect, the present invention is directed to a tubular member having a liner adhesively affixed to an inner surface thereof The tubular member comprises a rigid tubular shell having an inner surface and an outer surface. The liner again includes a first mat which is in this instance is secured to an inwardly facing one of the oppositely facing surfaces of the porous material and again includes a second mat which in this instance is secured to an outwardly facing one of the oppositely facing surfaces of the porous material. The tubular member further includes an adhesive impregnating the first mat, porous material and second mat of the liner so as to adhesively bond the liner together and to the inner surface of the rigid tubular shell. As before, the porous material is preferably formed by needle-punching the unwoven fibers into a sheet-like batt preferably having a preselected length and width dimension.

With regard to both aspects of the invention, the porous material advantageously includes a non-woven substrate, an intermediate mineral fiber layer, and a top layer of fibers less than approximately seven inches in length. These various layers comprise the plurality of unwoven fibers which are needle-punched to form the porous material. Still further, the finespun woven filaments of glass comprising the first and second mats of the liner are advantageously secured to the oppositely facing surfaces of the porous material as by needle-punching or the like.

In one highly preferred embodiment, the rigid tubular shell defining the tubular member comprises a pipe or tank. This pipe or tank may advantageously be of a type which is adapted to convey a fluid therethrough. For such applications, the adhesive for bonding the liner is preferably an amine cured epoxy or epoxy-polyamide.

Other objects, advantages and features of the present invention will become apparent from a consideration of the following specification taken in conjunction with the accompanying drawings.

DETAILED DESCRIPTION OF THE PREFERRED EMBODIMENT

Figures 1, 2:
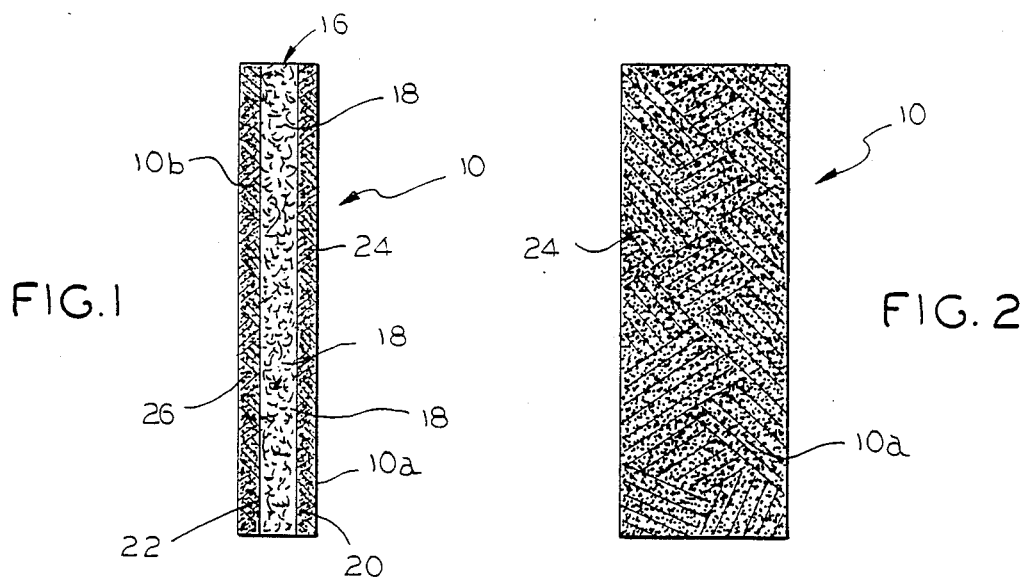
FIG. 1 is a cross sectional view of a liner adapted to be permanently adhesively affixed to an inner surface of a tubular member in accordance with the present invention.
FIG. 2 is a top plan view of the liner of FIG. 1.
Figure 7:
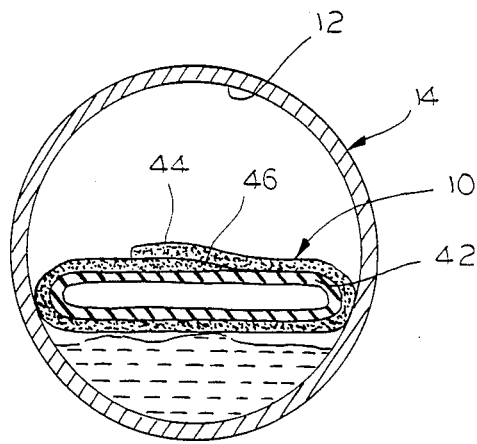
FIG. 7 is a cross sectional view illustrating a step of pulling a floating liner into a tubular member after it has been adhesively impregnated.
Figure 8:
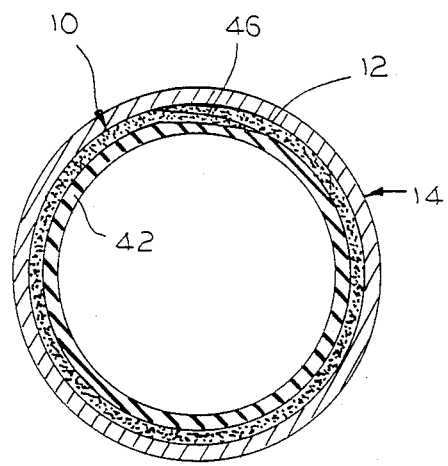
FIG. 8 is a cross sectional view illustrating a step of inflating an expandable bladder to place the liner into contact with the inner surface of the tubular member.
Figure 9:
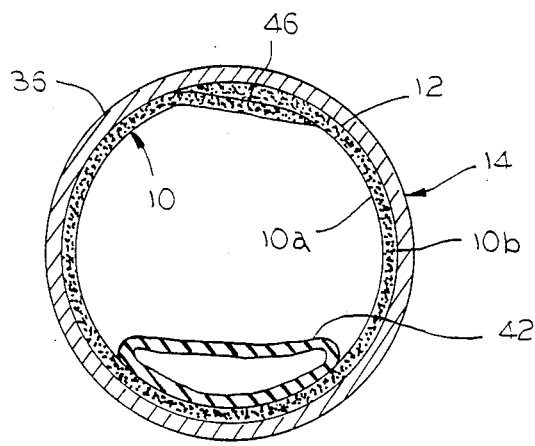
FIG. 9 is a cross sectional view illustrating a step of deflating the expandable bladder for removal after the liner has been adhesively bonded to the tubular member.

Referring to the drawings, and first to FIG. 1, the reference numeral 10 designates generally a liner adapted to be permanently adhesively affixed to an inner surface 12 of a tubular member 14 (see, also, FIGS. 7 through 9). The liner 10 includes a porous material 16 formed from a plurality of needle-punched unwoven fibers 18 so as to have a pair of oppositely facing surfaces 20 and 22. It will also be seen that the liner 10 includes a first mat 24 of finespun woven filaments of glass to define an inner surface 10a of the liner 10 which is generally coextensive with the porous material 16, and a second mat 26 of finespun woven filaments of glass to define an outer surface 10b of the liner 10 which is likewise generally coextensive with the porous material 16. The liner 10 also includes means for securing the first mat 24 to one of the oppositely facing surfaces 20 of the porous material 16 and means for securing the second mat 26 to the other of the oppositely facing surfaces 22 of the porous material 16. In the preferred embodiment, the porous material 16 is formed by needle-punching the unwoven fibers 18 into a sheet-like batt by means such as the schematically illustrated needle-punching apparatus 28 (see FIG. 3).

For the purpose of supplementing the disclosure of this application to provide a teaching of suitable fibers for the sheet-like porous material 16 as well as the manner in which it may be formed, the entirety of the commonly owned and earlier filed application of Conrad D'Elia, U.S. Ser. No. 069,826, filed on July 6, 1987 and entitled "Moldable Fibrous Composite and Methods", is hereby incorporated herein by reference.

Figure 3:
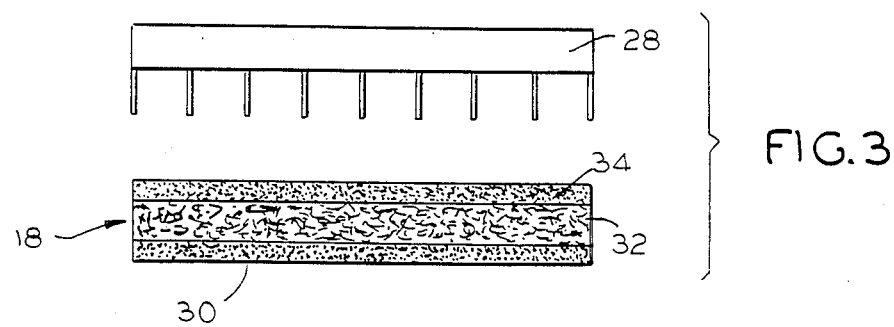
FIG. 3 is a schematic illustration of a first step in forming a liner by needle-punching a plurality of unwoven fibers to form a porous material.
Figure 4A:
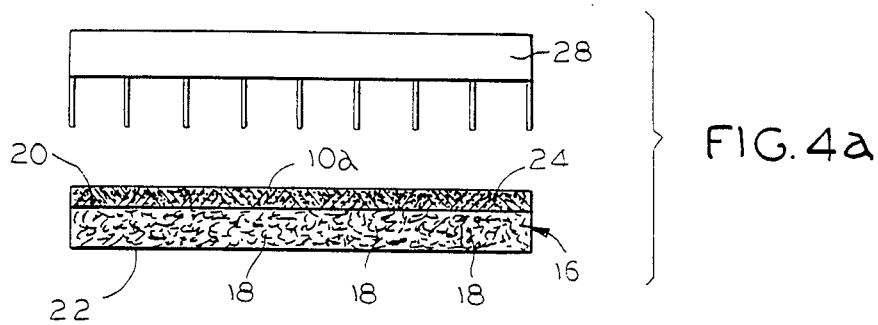
FIG. 4a is a schematic illustration of a second step in forming a liner by needle-punching a first mat to one of the oppositely facing surfaces of the porous material to secure the first mat thereto.
Figure 4B:
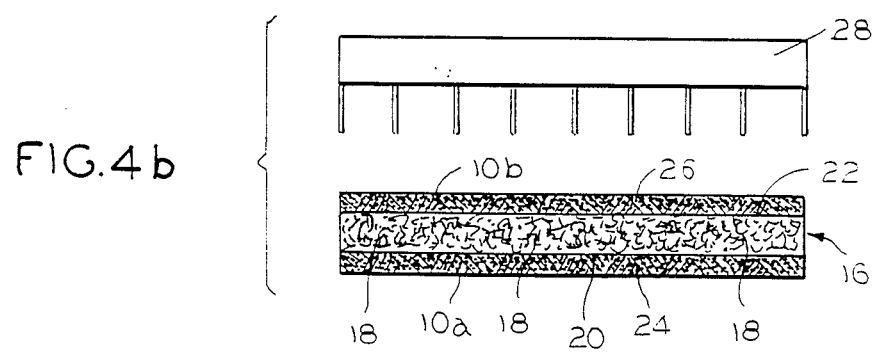
FIG. 4b is a schematic illustration of a third step in forming a liner by needle-punching a second mat to the other of the oppositely facing surfaces of the porous material to secure the second mat thereto.

As will be seen by referring to FIG. 3, the porous material 16 is preferably formed by utilizing the schematically illustrated needle-punching apparatus 28 to needle-punch a plurality of different layers 30, 32 and 34. These layers advantageously include a substrate 30 of non-woven material, an intermediate layer 32 of mineral fibers and a top layer 34 of fibers less than approximately seven inches in length. After the porous material 16 has been formed into a sheet-like batt, the apparatus 28 can be utilized to secure the first and second mats 24 and 26 to the porous material 16 by needle-punching as well (see FIGS. 4a and 4b).

In another respect, the present invention is directed to a tubular member 14 in the form of a rigid tubular shell having an outer surface 36 in addition to the inner surface 12 which has a liner 10 adhesively affixed thereto. When so considered, the liner 10 is such that the first mat 24 is secured to an inwardly facing one of the oppositely facing surfaces 20 of the porous material 16 and the second mat 26 is secured to an outwardly facing one of the oppositely facing surfaces 22 of the porous material 16.

Figure 5:
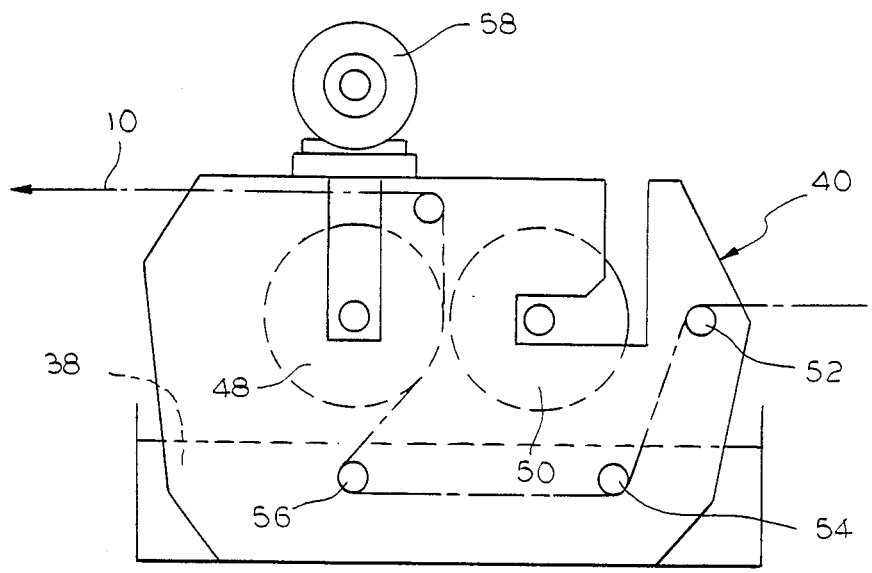
FIG. 5 is a schematic illustration of adhesively impregnating the liner so it may be permanently affixed to an inner surface of a tubular member.

In addition, the liner 10 is adhesively affixed to the inner surface 12 of the tubular member 14 by utilizing an adhesive 38 (see FIG. 5). More particularly, the adhesive 38 impregnates the first mat 24, the porous material 16 and the second mat 26 of the liner 10 so as to adhesively bond the outer surface 10b of the liner 10 to the inner surface 12 of the rigid tubular shell 14. Further, the adhesive 38 will bond together the first mat 24, the porous material 16 and the second mat 26 of the liner 10.

Referring to FIG. 5, it will be understood that this is simply a schematic illustration of one technique for adhesively impregnating the liner 10. The technique illustrated involves utilizing an impregnation bath 40 which will be described in greater detail hereinafter. With this technique, the adhesive retention capacity of the liner 10 is greatly enhanced by using the unique porous material 16.

While it has previously been mentioned that the porous material 16 may be formed into a sheet-like batt, it should also be noted that the sheet-like batt should be formed to have a preselected length and width dimension. This is, of course, highly advantageous particularly where the liner 10 will be utilized for a given length and circumference of tubular member, e.g., a pipe or tank, such as 14. By providing a preselected length and width dimension for the batt, the resulting liner 10 will be such as to substantially entirely cover the inner surface 12 of the pipe or tank 14.

With the present invention, the liner 10 is particularly well suited for a pipe or tank which conveys a fluid therethrough. The adhesive for such an application will advantageously comprise an amine cured epoxy or epoxy-polyamide as will be described in greater detail hereinafter. In any event, the liner 10 is very effective for repairing leaks and/or extending the useful life of such pipes or tanks 14.

In accordance with the invention, a method of lining a tubular member 14 having an inner surface 12 and an outer surface 36 has been provided. The method includes the steps of providing a porous material 16 formed from a plurality of needle-punched unwoven fibers 18 to have a pair of oppositely facing surfaces 20 and 22, securing a first mat 24 of finespun woven filaments of glass to one of the oppositely facing surfaces 20 of the porous material 16 to define an inner surface 10a of the liner 10, securing a second mat 26 of finespun woven filaments of glass to the other of the oppositely facing surfaces 22 of the porous material 16 to define an outer surface 10b of the liner 10 and adhesively impregnating the liner 10 with an adhesive 38 for the purpose of bonding together &.he first mat 24, porous material 16 and second mat 26 thereof. In addition, the method comprises the step of placing the outer surface 10b of the adhesively impregnated liner 10 into contact with the inner surface 12 of the tubular member 14 for adhesively bonding the liner 10 to the tubular member 14.

As suggested previously, the method contemplates the porous material 16 being formed by needle-punching the unwoven fibers 18 into a sheet-like batt having a preselected length and width dimension. It also contemplates the porous material 16 and, more particularly, the unwoven fibers which have been generally designated 18, as comprising a non-woven substrate 30, an intermediate mineral fiber layer 32 and a top layer 34 cf fibers less than approximately seven inches in length, all of which have been needle-punched as by the schematically illustrated needle-punching apparatus 28 (see FIG. 3). Still further, the method contemplates the first and second mats 24 and 26 being secured to the oppositely facing surfaces 20 and 22 of the porous material 16 as by needle-punching.

In the preferred embodiment, the lining method is useful where the tubular member 14 comprises a rigid tubular shell in the form of a pipe or tank for conveying a fluid therethrough. More specifically, the tubular member 14 preferably comprises a liquid conveying pipe and the liner 10 is pulled into the pipe while floating on water as at 41 (see FIG. 7) after being adhesively impregnated following which the outer surface 10b of the adhesively impregnated liner 10 is placed into contact with the inner surface 12 of the pipe 14 by inflating an expandable bladder 42 which is pulled into the pipe 14 along with the liner 10 (compare FIGS. 7 and 8). In this connection, the expandable bladder 42 is preferably inflated with a hot gas under pressure (such as air) to accelerate curing of the adhesive to bond the adhesively impregnated liner 10 to the pipe 14.

More particularly, the hot gas is preferred over a liquid for purposes of inflating the bladder 42. This is so because it makes it possible to control temperature and pressure and, thus, curing of the adhesive and bonding of the liner, to a much greater degree than heretofore possible in any other pipe liner technique. In addition, the bladder 42 is preferably slightly smaller than the inner diameter of the tubular member 14. This is so because the bladder 42 can then be put under sufficient pressure to cause it to stretch and expand to thereby eliminate the possibility of wrinkles that might adversely affect the finished liner 10. Since the bladder 42 is preferably formed of polyurethane, it is well suited for use in this manner.

By way of example, the bladder 42 may be formed of a polyether or polester grade polyurethane film because of its abrasion and tear resistance, tensile strength and elongation characteristics. The polyurethane film is seamless in the preferred embodiment so as to be more likely to ensure against leaks that might otherwise occur at the seam due to the temperature and pressure of the bladder inflating hot gas. Furthermore, the absence of seams gives even inflation and expansion characteristics to the bladder 42 which would not occur if there was a seam due to the double thickness of material.

While a seamless bladder is preferred for the enumerated reasons, it will be appreciated that a bladder having a seam can be utilized if desired.

For a sewer pipe application, the adhesive is preferably of a non-water soluble type which is also abrasive resistant. As a result, water can be introduced to float the liner 10 from the high end of a sewer pipe while pulling it toward the low end thereof and, due to the needle-punched nature of the porous material 16 and mats 22 and 24, the liner has excellent tensile strength which accommodates pulling the liner through the pipe. Of course, for other applications, the adhesive will be selected to be compatible with the given environment.

As for the adhesive, it will preferably have an inherently low viscosity without resort to solvents. It should also be operable over a wide range of ambient temperatures to accommodate installation in all climates at any time of the year. If solvents are used to control viscosity, they could be dissolved by water in the pipe.

Also, the adhesive should harden or cure in a reasonably short period of time to reduce the cost of installation. Otherwise, installation crews could become prohibitively expensive. Further, the adhesive should have the strength necessary to render the liner a free-standing pipe structure.

Among the epoxy resin curing agents that are believed suitable are aliphatic amines and derivatives which provide room temperature cure and aliphatic/cycloaliphatic amines which provide moderate temperature cure.

Typically, the adhesive will consist of an appropriate mixture of epoxy resin and curing agent, and it may also have a gel accelerator or a gel inhibitor in an amount sufficient depending upon the particular ambient conditions to be encountered.

As shown in FIG. 7, the liner 10 will be folded over so as to overlap itself with the bladder 42 positioned therewithin. The liner 10 can be held in this position by means such as hot melt adhesive as at 44 or by other means such as a breakable string 45 or the like (see FIG. 6) which will rupture once the liner is in position within the tubular member 14 and inflation of the bladder 42 is initiated. After the bladder 42 is fully inflated, the liner 10 will overlap as at 46 to ensure a continuous leak resisting barrier (see FIG. 8).

In a typical application, the folding over of the liner 10 with the bladder 42 inside is performed at a remote location. Thus, this operation can be performed under controlled conditions at a plant where the hot melt adhesive 44 or string can be applied to maintain the liner 10 and bladder 42 together during shipment to an installation site. Once at the site, the liner 10 and bladder 42 can be passed through the adhesive impregnation bath 40 immediately prior to placement in the pipe 14.

Referring to FIG. 5, the preferred method of adhesively impregnating the liner 10 is illustrated as including utilization of the previously mentioned impregnation bath 40. The impregnation bath 40 precisely controls the pick-up of epoxy resin 38 by means of the drive roller 48 and the idler roller 50, i.e., by reason of the spacing between these two rollers which may suitably be controlled by adjustably mounting the idler roller 50, and in this manner the proper ratio or amount of epoxy resin in the liner 10 can be obtained. Preferably, the drive roller 48 is knurled to pull the liner 10 over the feed rollers 52, 54 and 56 along the path illustrated after which the liner 10 exits the impregnation bath.

As shown, a roll drive 58 is drivingly operatively interconnected to the drive roller 50 whereby the drive roller 48 can pull the liner 10 over the feed rollers 52, 54 and 56. It will also be seen that the feed roller 56 is positioned generally below the drive roller 50 so that a significant portion of the liner 10 is in contact with the knurled surface of the drive roller, i.e., partially wrapped thereabout, at any given time. With this arrangement, the drive roller 50 is well suited for its intended purpose of pulling the liner 10 in an effective manner without damaging the liner.

Figure 6:
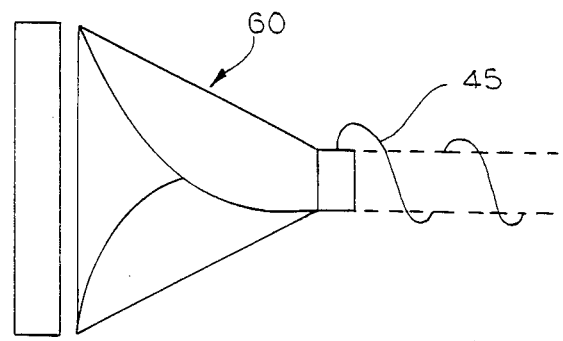
FIG. 6 is a schematic illustration of spirally rolling the liner about a bladder prior to introducing the liner into a tubular member.

As previously mentioned, before the liner 10 is passed through the adhesive impregnation bath 40, it may be passed through the liner overlap or spiral roll device 60 (see FIG. 6). This device 60 can operate in any of a number of different ways, e.g., it can simply overlap the liner 10 and apply a hot melt adhesive as at 44 as illustrated in FIG. 7, it can spirally roll the liner 10 and apply a breakable string 45 as illustrated in FIG. 6, or it can simply spirally wind the liner lo and allow the adhesive and spiral winding to hold the liner in this position as it is moved into position within the pipe 14. In all cases, the bladder 42 will be fed centrally of the liner 10 as the device 60 performs the liner overlap or spiral roll function.

If a hot melt adhesive as at 44 is utilized, it preferably has high elongation characteristics so it will not "break" during transport. Moreover, it will simply stretch during inflation of the bladder 42 to maintain the liner 10 in the desired configuration as it expands radially.

While not previously mentioned, the bladder 42 preferably has a release agent incorporated into the polyurethane formulation to accommodate ready removal of the bladder after the epoxy resin has cured. However, to facilitate cure, heated air is forced through the tubular member or pipe 14 and maintained at a pressure through at least the initial stages of cure, i.e., until the epoxy resin is such as to withstand the forces on the liner 10 within the pipe 14. For this purpose, the hot gas must be bled off at the exit end of the pipe 14 by means such as a relief valve (not shown) whereby the pressure is maintained at a sufficient level.

In particular, the hot gas should be maintained at a pressure sufficient to maintain the liner 10 in contact with the inner surface 12 of the pipe 14 without squeezing the epoxy resin out of any portion of the liner. However, it should be understood that the bladder 42 may squeeze a certain limited amount of the epoxy resin out of the liner 10 so as to fill cracks in the host pipe 14.

Preferably, the hot gas is provided by means of an electric or gas air heater together with a blower capable of moving a desired quantity of heated air into the bladder 42 in the pipe 14. The heated air should be provided in sufficient quantity to maintain the desired temperature throughout the length of the pipe 14 which may reach up to six hundred feet long. In this connection, the pipe 14 will serve as a significant heat sink which means that the relief valve and air heater should be interconnected by control means of a type that is conventional in the art.

In other words, the control means will be of the type that will ensure air passing through the bladder 42 at an adequate temperature and flow rate to maintain the desired temperature and pressure to cure the adhesive.

After the adhesively impregnated liner 10 has been bonded to the pipe 14, the expandable bladder 42 is deflated (see FIG. 9) so that it may then be removed from the pipe 14. Since the bladder 42 is preferably formed of a polyurethane formulation having a release agent, it will not bond to the inwardly facing surface 10a of the liner 10 and, thus, it is easily removable from the pipe 14.

As will be appreciated, the resulting composite formed of the tubular member. 14 and liner 10 is extremely strong. The utilization of the mats 24 and 26 formed of fiberglass together with the intermediate layer of porous material 16 which holds the resin during placement of the liner 10 in the tubular member 14 not only results in a strong bond of the one mat of fiberglass 26 to the inner surface 12 of the tubular member or pipe 14 but also forms a strong structural member from the entirety of the liner 10 by adhesively bonding the first and second mats 24 and 26 and porous material 16 tightly together. As a result, the inwardly facing surface 10a of the liner 10 serves to provide a leak proof barrier for the overall composite formed of the liner 10 and tubular member 14.

In practice, it is contemplated that the porous material 16 will be needle-punched approximately one thousand to fourteen hundred punches per square inch. It is also contemplated that the mats 24 and 26 will be needle-punched approximately four hundred punches per square inch or just enough to hold the glass in place. Because of the combination of characteristics of the mats 24 and 26 and the porous material 16, it is possible to pull the liner 10 through the tubular member 14 without any separation of the components thereof.

With the present invention, the liner 10 serves not only as a barrier against leaks through a tubular member 14 but also as a substantial reinforcement the tubular member. It does this by reason of the direct bonding of the liner 10 to the inner surface 12 of the tubular member 14 and by reason of the reinforcing fibers inherent in the liner 10 which in conjunction with the adhesive achieve what comprises a free-standing tubular member integral with the tubular member 14 to be repaired. Unlike prior attempts to repair a pipe with a felt liner, the liner 10 will not shrink away from the tubular member 14 and, thus will not produce an annulus through which leakage may still occur.

While in the foregoing there has been set forth a preferred embodiment of the invention, it will be appreciated that the details herein given are merely for purposes of illustration and may be varied by those skilled in the art without departing from the spirit and scope of the invention as defined by the appended claims.

I claim:

1. A tubular member having a liner adhesively affixed to an inner surface thereof, comprising:

a rigid tubular shell having an inner surface and an outer surface defining said tubular member;

said liner including a porous material formed from a plurality of needle-punched unwoven fibers, said porous material having a pair of oppositely facing surfaces;

said liner also including a first mat of finespun woven filaments of glass defining an inner surface of said liner, said inner surface of said liner being generally coextensive with said porous material, said first mat being secured to an inwardly facing one of said oppositely facing surfaces of said porous material;

said liner also including a second mat of finespun woven filaments of glass defining an outer surface of said liner, said outer surface of said liner being generally coextensive with said porous material, said second mat being secured to an outwardly facing one of said oppositely facing surfaces of said porous material; and an adhesive impregnating said first mat, said porous material and said second mat of said liner, said adhesive bonding said outer surface of said liner to said rigid tubular shell, said adhesive also bonding said first mat, said porous material and said second mat of said liner.

2. The tubular member as defined in claim 1 wherein said porous material is formed by needle-punching said unwoven fibers into a sheet-like batt having a preselected length and width dimension.

3. The tubular member as defined in claim 2 wherein said porous material includes a non-woven substrate, an intermediate mineral fiber layer, and a top layer of fibers less than approximately seven inches in length.

4. The tubular member as defined in claim 1 wherein said first and second mats are secured to said oppositely facing surfaces of said porous material by needle-punching.

5. The tubular member as defined in claim 1 wherein said rigid tubular shell defining said tubular member comprises a pipe or tank for conveying a liquid therethrough.

6. The tubular member as defined in claim 1 wherein said adhesive is an amine cured epoxy or epoxy-polyamide.

* * * * *